United States Patent
Rostocki et al.

(10) Patent No.: US 10,569,762 B2
(45) Date of Patent: Feb. 25, 2020

(54) METHOD FOR OPERATING A MOTOR VEHICLE AND MOTOR VEHICLE

(71) Applicants: VALEO SCHALTER UND SENSOREN GMBH, Bietigheim-Bissingen (DE); BAYERISCHE MOTOREN WERKE AKTIENGESELLSCHAFT, München (DE)

(72) Inventors: Paul-David Rostocki, Bietigheim-Bissingen (DE); Michael Hallek, Bietigheim-Bissingen (DE); Ulrich Bressler, Bietigheim-Bissingen (DE); Armin Bartsch, München (DE); Thorben Guenzel, Braunschweig (DE)

(73) Assignees: Valeo Schalter und Sensoren GmbH, Bietigheim-Bissingen (DE); Bayerische Motoren Werke Aktiengesellschaft, München (DE)

( * ) Notice: Subject to any disclaimer, the term of this patent is extended or adjusted under 35 U.S.C. 154(b) by 371 days.

(21) Appl. No.: 15/320,977

(22) PCT Filed: Jun. 8, 2015

(86) PCT No.: PCT/EP2015/062712
§ 371 (c)(1),
(2) Date: Dec. 21, 2016

(87) PCT Pub. No.: WO2015/197350
PCT Pub. Date: Dec. 30, 2015

(65) Prior Publication Data
US 2017/0197612 A1    Jul. 13, 2017

(30) Foreign Application Priority Data
Jun. 25, 2014   (DE) .................. 10 2014 108 865

(51) Int. Cl.
*B60W 20/16*    (2016.01)
*G01S 15/931*   (2020.01)
(Continued)

(52) U.S. Cl.
CPC ............ *B60W 20/16* (2016.01); *B60W 10/06* (2013.01); *B60W 10/08* (2013.01);
(Continued)

(58) Field of Classification Search
None
See application file for complete search history.

(56) References Cited

U.S. PATENT DOCUMENTS 2,981,062 A * 4/1961 Zeiden ................ F02C 7/00
                                                60/39.091
6,698,387 B1 * 3/2004 McFarland ........... F02B 47/02
                                                123/25 A
(Continued)

FOREIGN PATENT DOCUMENTS

CN    101687501 A    3/2010
CN    102312747 A    1/2012
(Continued)

OTHER PUBLICATIONS

SIPO; App. No. 201580040936.X; The First Office Action dated Jun. 5, 2018.
(Continued)

*Primary Examiner* — Shelley Chen
(74) *Attorney, Agent, or Firm* — Fitch, Even, Tabin & Flannery LLP

(57) ABSTRACT

The invention relates to a method for operating a motor vehicle, in which by at least one ultrasonic sensor, operated in the active operation mode, of an ultrasonic sensor device of the motor vehicle ultrasonic waves are emitted into an environmental region of the motor vehicle, wherein the
(Continued)

motor vehicle as hybrid vehicle is equipped with an internal combustion engine (and an electric drive machine and in the active operation mode of the ultrasonic sensor arranged on a rear part of the motor vehicle the motor vehicle at least temporarily is operated by means of the electric drive machine. The invention also relates to a motor vehicle.

14 Claims, 2 Drawing Sheets

(51) Int. Cl.
G01S 15/02 (2006.01)
G01S 15/87 (2006.01)
G01S 7/52 (2006.01)
B60W 10/06 (2006.01)
B60W 10/08 (2006.01)
G01S 15/88 (2006.01)

(52) U.S. Cl.
CPC ........ G01S 7/52004 (2013.01); G01S 15/025 (2013.01); G01S 15/87 (2013.01); G01S 15/931 (2013.01); B60W 2400/00 (2013.01); B60W 2420/00 (2013.01); B60W 2510/06 (2013.01); B60W 2510/068 (2013.01); B60W 2510/0676 (2013.01); B60W 2710/06 (2013.01); B60W 2710/08 (2013.01); B60Y 2200/92 (2013.01); B60Y 2300/182 (2013.01); B60Y 2300/18033 (2013.01); B60Y 2300/43 (2013.01); B60Y 2300/47 (2013.01); B60Y 2300/60 (2013.01); B60Y 2400/302 (2013.01); B60Y 2400/306 (2013.01); B60Y 2400/3018 (2013.01); G01S 15/88 (2013.01); G01S 2007/52011 (2013.01); G01S 2015/932 (2013.01); G01S 2015/938 (2013.01); Y10S 903/93 (2013.01)

(56) References Cited

U.S. PATENT DOCUMENTS

| | | | | |
|---|---|---|---|---|
| 2005/0235956 A1* | 10/2005 | Watanabe | ............. | F02P 5/1523 123/406.26 |
| 2007/0276565 A1 | 11/2007 | Kuttenberger et al. | | |
| 2014/0039750 A1* | 2/2014 | Yopp | ...................... | G01N 29/32 701/33.1 |
| 2014/0346283 A1* | 11/2014 | Salyer | ..................... | B64C 37/00 244/7 A |
| 2015/0046032 A1* | 2/2015 | Clarke | ............... | B60G 17/0165 701/37 |
| 2015/0046071 A1* | 2/2015 | Clarke | ............ | B60W 30/18018 701/112 |

FOREIGN PATENT DOCUMENTS

| | | |
|---|---|---|
| CN | 103597526 A | 2/2014 |
| DE | 10247971 A1 | 5/2004 |
| DE | 102007005030 A1 | 8/2008 |
| DE | 102009060177 A1 | 10/2010 |
| DE | 102009040992 A1 | 3/2011 |
| DE | 102010021960 A1 | 12/2011 |
| KR | 100264173 B1 * | 8/2000 |
| WO | 2012123555 A1 | 9/2012 |
| WO | 2013030985 A1 | 3/2013 |

OTHER PUBLICATIONS

International Search Report (English—2 pages) and Written Opinion (German—10 pages) for Application No. PCT/EP2015/062712 dated Sep. 18, 2015.

Lodewyks, K., Toyota Auris HSD now in SA, Online CARmag.co.za, Apr. 4, 2013 (1 page).

* cited by examiner

METHOD FOR OPERATING A MOTOR VEHICLE AND MOTOR VEHICLE

CROSS-REFERENCE TO RELATED APPLICATION

This application is a U.S. national phase application of International Application No. PCT/EP2015/062712, filed Jun. 8, 2015, designating the United States, which claims priority to German Patent Application No. 10 2014 108 865.4, filed Jun. 25, 2014, which is incorporated by reference herein in its entirety.

FIELD

The invention relates to a method for operating a motor vehicle, in which by at least one ultrasonic sensor ultrasonic waves are emitted into an environmental region of the motor vehicle for performing a distance measurement. The invention moreover relates to a motor vehicle.

BACKGROUND

Ultrasonic sensors for motor vehicles are already known from the prior art in various designs. They are commonly employed for assisting the driver in maneuvering the motor vehicle, in particular in performing parking operations. By means of the ultrasonic sensors in this connection distances from obstacles are measured, which are present in the environment of the motor vehicle. The ultrasonic sensors here are part of a driver assistance device, which is referred to as parking aid. However, ultrasonic sensors today more and more frequently are employed outside this actual parking aid functionality, such as for instance for driving assistance with active braking intervention, i.e. with automatic braking assistance systems, in systems for blind spot monitoring, in systems for keeping a distance, collision recognition systems, and the like.

Ultrasonic sensors work according to the echo transit time principle: The distance measurement in ultrasound technology is performed by means of an echo transit time method or echo sounding method. The ultrasonic sensor emits an emission signal—ultrasound—and receives a receive signal, which equally is a sound signal and corresponds to a signal portion of the emission signal, which is emitted and reflected by an obstacle. This means that ultrasonic waves are emitted, reflected by an object, and received again and analyzed by the same ultrasonic sensor and/or an adjacent ultrasonic sensor of the same motor vehicle. In dependence on the measured transit time of the ultrasonic wave then the distance and possibly also the relative position and/or a relative speed relative to the motor vehicle are determined.

It may also occur that an ultrasonic sensor of a motor vehicle is blocked. Methods, which serve for recognizing a blocked state of an ultrasonic sensor, are already known from the prior art. In the prior art in this connection a situation is recognized, in which the ultrasonic sensor is covered by an additional mass, such as dirt and/or snow and/or ice. Since ultrasonic sensors nowadays more and more frequently are also used outside the actual parking aid functionality, in the operation of the motor vehicle it should be made sure that the ultrasonic sensors present on the motor vehicle reliably recognize the obstacles present in the environment of the motor vehicle respectively are also capable of reliably determining the distances up to a predetermined range. If the ultrasonic sensors are covered by an additional mass, this should be reliably detected. The known methods for recognition of ice or dirt are generally based on the analysis of side effects, which are caused by the additional mass on the ultrasonic sensor. Thus, by an additional mass for instance the so-called die-away time of the membrane of the ultrasonic sensor is influenced or a virtual echo or a fraudulent echo is generated, which can be detected by corresponding analysis of the electric receipt signal of the ultrasonic sensor.

In the subject matter according to DE 102 47 971 A1 the natural frequency or resonant frequency of the ultrasonic sensor is measured and compared with the stored reference values. This method is based on the fact that the resonant frequency of the ultrasonic sensor is a direct indicator of a soiling, ice or snow layer, since this additional layer affects the mass of harmonious vibration. With the additional mass of the dirt or the ice or snow layer namely also the vibrating mass and consequently the resonant frequency of the sensor changes.

In order to be able to recognize a state of an ultrasonic sensor covered in dirt and/or ice and/or snow, the DE 10 2009 040 992 A1 suggests, to determine the die-away time of the ultrasonic sensor subsequent to an excitation of the membrane and to compare it with the excitation frequency. Depending on the result of this comparison it is determined whether the ultrasonic sensor is blocked or not.

Further the DE 10 2010 021 960 A1 describes a method, in which for recognizing the blocked state of an ultrasonic sensor the die-away time of the membrane is analyzed over several measurement cycles of the ultrasonic sensor. A further plausibility check here can consist in that a temperature of the environment of the motor vehicle remains below a predetermined limit value. This limit value can for instance be 0° C. Thus the error rate in recognizing the blocked state can be reduced.

It has also turned out that whilst in some situations the ultrasonic sensor may be blocked, however this "blindness" of the ultrasonic sensor is not caused by an additional mass on the ultrasonic sensor itself. This is because situations have been detected, in which a "blindness" of the ultrasonic sensor has occurred even without an essential change of the die-away time of the membrane as well as without change of the resonant frequency.

It is task of the invention in a method of the initially mentioned kind and a motor vehicle to take measures that allow for a reliable operation of the at least one ultrasonic sensor.

This task according to the invention is solved by a method and a motor vehicle having the features according to the respective independent patent claims.

SUMMARY

In a method for operating a motor vehicle according to the invention by at least one ultrasonic sensor, operated in the active mode, of an ultrasonic sensor device of the motor vehicle ultrasonic waves are emitted into an environmental area of the motor vehicle. An essential idea of the invention consists in that the motor vehicle as hybrid vehicle is equipped with an internal combustion engine and an electric drive machine and at least temporarily in the active operation mode of the ultrasonic sensor arranged on a rear part of the motor vehicle the motor vehicle is operated or driven by means of the electric drive machine. Thereby the emitting of ultrasonic waves is not impaired by an exhaust gas cloud, as it is generated in the operation of the internal combustion engine.

Preferably, in the case that upon activating the ultrasonic sensor the motor vehicle is operated by means of the internal combustion engine, the internal combustion engine is switched off and the electric drive machine activated. It is thus checked whether the internal combustion engine is active and, if so, it is switched off and the driving of the motor vehicle by means of the electric drive machine is performed.

Preferably, on the basis of sensor data of at least one sensor of the motor vehicle that is different from the ultrasonic sensor an exhaust gas cloud, which is emitted by an exhaust system of the motor vehicle into the environmental region and generated by the internal combustion engine in the active operation mode and on which the ultrasonic waves are reflected, is detected and in dependency on the detection of the exhaust gas cloud the internal combustion engine is switched off and the electric drive machine activated. In this embodiment thus to start with it is practically checked whether an exhaust gas cloud is present and, if so, only then it is switched over to the electric drive machine. Since for instance then a relatively strong wind is blowing, and the exhaust gas cloud is quickly dissolved and thus then is not interfering with the ultrasonic waves, it is not necessarily immediately switched over to the drive machine.

Preferably, the active operation of the motor vehicle by means of the electric drive machine is started upon activating the ultrasonic sensor. In this embodiment, unless the hitherto driving of the motor vehicle is effected by means of the electric drive machine anyway, it is thus in particular immediately switched over to the electric drive machine. Thereby diagnosis effort for determining an exhaust gas cloud is avoided, whereby also a temporal advantage for the start of an active operation of the ultrasonic sensor is achieved. In this embodiment thus, irrespective of whether an exhaust gas cloud, which is detrimental to the operation of the ultrasonic sensor, is present at all, the electric drive machine is operated, if the ultrasonic sensor is to be active.

Preferably, the active operation of the ultrasonic sensor upon starting a driver assistance system, with which the ultrasonic sensor is functionally associated, is started.

In particular the active operation of the ultrasonic sensor is started upon engaging a reverse gear selection of the motor vehicle.

The advantageous embodiment is based on several insights: To start with, on the insight that in the prior art sometimes situations may occur, in which a blocked state or a "blindness" of the ultrasonic sensor cannot be detected on the basis of vibration parameters of the ultrasonic sensor. This is because a "blindness" of the ultrasonic sensor can also occur without the die-away time or else the resonant frequency of the sensor essentially changing. This state cannot be detected in the prior art and thus also cannot be indicated. A further insight consists in that such a situation can be caused due to an exhaust gas cloud forming in the region of the ultrasonic sensor, the exhaust gas cloud being emitted by an exhaust system of the motor vehicle. The invention is based not least on the insight that the disadvantages of the prior art can be avoided in that such an exhaust gas cloud, on the surface or boundary layer of which the ultrasonic waves are potentially reflected and thus may corrupt the distance measurement, is detected by the ultrasonic sensor device and then corresponding measurements are taken, which ensure a safe operation. The ultrasonic sensor device thus can be operated particularly safely and reliably.

The term exhaust gas cloud in the present case is understood to relate to a phase and thus a particularly high concentration of an exhaust gas, which is outputted by the exhaust system of the motor vehicle and then concentrates in the region of a tail pipe of the exhaust system. It has turned out that such an exhaust gas cloud comprises a boundary layer, on which the ultrasonic waves can be reflected. This reflection causes a signal echo on the ultrasonic sensor, which in the prior art is incorrectly interpreted as detection of an object.

With regard to the detection of the exhaust gas cloud in the capture range of the ultrasonic sensor in one embodiment it may be envisaged that in dependence on the named sensor data a probability value is calculated, which indicates the current probability for the presence of such exhaust gas cloud, on which ultrasonic waves can be reflected. The exhaust gas cloud then can be detected or the detection can then be confirmed, if the calculated probability value exceeds a predetermined threshold value. For the calculation of the probability value in particular several measurement parameters can be considered, which can be captured by the most different sensors of the motor vehicle. The more measurement quantities or parameters are considered in the calculation of the probability value, the more precise and true to reality this probability for the presence of the exhaust gas cloud can be determined.

In one embodiment it can be envisaged that the detecting of the exhaust gas cloud, in particular the determination of the probability value, is effected depending on at least one measurement parameter as sensor data, which is measured by means of a sensor arranged in the exhaust system itself. The employment of such sensor has the advantage that on the basis of sensor data of this sensor very reliably the concentration of the exhaust gas in the region of the tail pipe can be concluded and thus it can be determined with great precision whether in the region of the ultrasonic sensor an exhaust gas cloud forms, which represents an obstacle to the ultrasonic waves.

In particular the detection of the exhaust gas cloud, in particular the exhaust gas boundary layer, can be effected in dependence on at least one of the following measurement parameters:

- a temperature of the exhaust gas—this can be captured by means of a temperature sensor in the exhaust system; for the detection of the exhaust gas cloud it can be made a prerequisite that the temperature of the exhaust gas is larger than a predetermined threshold value—this means in particular that the above-named probability value only then can be larger than zero, if the temperature of the exhaust gas is larger than the threshold value; and/or
- a humidity of the exhaust gas—this can for instance be captured by means of a humidity sensor in the exhaust system; for the detection of the exhaust gas cloud it can be made a prerequisite that the humidity of the exhaust gas is larger than a predetermined assigned threshold value—this means in particular that the above-named probability value can only then be larger than zero if the humidity of the exhaust gas is larger than the assigned threshold value; and/or
- a flow rate of the exhaust gas—also in this respect it can be envisaged that the exhaust gas cloud can only then be detected or the probability value be larger than zero if the flow rate is larger than a predetermined assigned threshold value; and/or
- an exhaust gas pressure—also for this measuring parameter a corresponding threshold value can be predefined, with which the current exhaust gas pressure is compared, wherein the detection of the exhaust gas cloud requires that the exhaust gas pressure is larger than the assigned threshold value; and/or a mass flow of the exhaust gas—also this can be compared with an assigned threshold value; the exhaust gas cloud can only then be detected if the mass flow is larger than the assigned threshold value; and/or a measurement parameter characterizing the ratio of a combustion air and a fuel in at least one combustion chamber of an internal combustion machine of the motor vehicle, which is measured in particular by means of a Lambda sensor—the detection of the exhaust gas cloud can require that the ratio combustion air/fuel is smaller than an assigned threshold value.

Additionally or alternatively, it may be envisaged that upon detecting the exhaust gas cloud also a current engine temperature of an internal combustion engine of the motor vehicle is considered as sensor data. This is because the relation applies that the engine temperature is the smaller the larger the probability of the presence of an exhaust gas cloud.

It may also be envisaged that the detecting of the exhaust gas cloud is effected in dependence on the atmospheric environmental conditions of the motor vehicle, as in particular in dependence on a wind speed and/or an air humidity and/or an air temperature in the environment of the motor vehicle. These parameters can be captured by means of corresponding sensors and/or in dependence on a current geographic position of the motor vehicle, which are captured by means of a navigation receiver—in particular a GPS receiver—and are transmitted to an internet server, which then reports the current atmospheric environmental conditions for the current position of the motor vehicle to the motor vehicle. Also the atmospheric environmental conditions have an influence on the generation of an exhaust gas cloud in the area of the motor vehicle. Accordingly, the presence of the exhaust gas cloud is the more likely the lower the air temperature and/or the greater the air humidity of the environment.

If the air temperature is captured, a difference in temperature between the exhaust gas temperature, on the one hand, and the air temperature, on the other hand, and/or a difference between the engine temperature, on the one hand, and the air temperature, on the other hand, is determined and considered in the detection of the exhaust gas cloud. The larger this difference in temperature, the larger is namely the probability of the presence of an exhaust gas cloud in the region of the tail pipe of the exhaust system.

The detecting of the exhaust gas cloud, and in particular the calculation of the probability for the presence of the exhaust gas cloud, can also be effected in consideration of the at least one construction parameter of the motor vehicle. As construction parameter at least one of the following parameters can be considered:

a distance between the ultrasonic sensor, on the one hand, and an outlet of a tail pipe of the exhaust system, on the other hand—this is because the relation applies that the smaller this distance, the larger is the probability of the presence of an exhaust gas cloud in the capture range of the ultrasonic sensor; and/or a cross-sectional size of the tail pipe—also the cross section of the tail pipe namely has an influence on the generation of the exhaust gas cloud in the region of the tail pipe; and/or the number of tail pipes of the exhaust system and/or the number of exhaust gas turbo chargers of the motor vehicle and/or a cubic capacity of an internal combustion engine of the motor vehicle, i.e. a cubic capacity and/or a type of the internal combustion engine, i.e. whether the internal combustion engine is an Otto engine or a diesel engine.

In the detection of the exhaust gas cloud optionally also at least one parameter can be considered, which is captured by the ultrasonic sensor itself. And the detecting of the exhaust gas cloud, in particular the calculation of the probability value, can be effected in dependence on a transit time of the ultrasonic waves and thus depending on the measured distances and/or in dependence on the number of target echoes or the number of detected objects. In this connection a direct measurement, in which one and the same ultrasonic sensor emits the ultrasonic waves and then receives the target echoes, and/or an indirect measurement are considered, in which an ultrasonic sensor emits the ultrasonic waves and an ultrasonic sensor receives the target echoes. If for instance an object is detected at a very small distance, same for plausibility of the detection of the exhaust gas cloud can be interpreted to the effect that this close object is the exhaust gas cloud itself. In this way the detection of the exhaust gas cloud can be reliably checked for plausibility.

The invention moreover relates to an ultrasonic sensor device for a motor vehicle, comprising at least one ultrasonic sensor and a control unit, which is configured for controlling the ultrasonic sensor for emitting ultrasonic waves into an environmental region of the motor vehicle for performing a distance measurement. The ultrasonic sensor device is configured for performing a method according to the invention.

A motor vehicle according to the invention, in particular a passenger car, includes an ultrasonic sensor device, which comprises at least one ultrasonic sensor, through which in active operation ultrasonic waves are emittable in an environmental region of the motor vehicle. The motor vehicle comprises an internal combustion engine and an electric drive machine, wherein the motor vehicle at least temporarily in the active operation of the ultrasonic sensor arranged on a rear part of the motor vehicle is driven or operated by means of the electric drive machine.

It turns out to be advantageous, if as a consequence of the detection of the exhaust gas cloud the internal combustion engine of the motor vehicle is switched off and operation of the electric drive machine is started for driving the motor vehicle. This measure has the advantage that the exhaust gas cloud dissolves immediately upon switching off the internal combustion engine and thus the operation of the ultrasonic sensor device is no longer prevented.

The preferred embodiments presented with regard to the method according to the invention and their advantages correspondingly apply to the motor vehicle according to the invention.

Further features of the invention derive from the claims, the figures, and the description of the figure. All features and feature combinations named in the description and the features and feature combinations named in the following in the description of the figures and/or shown in the figures alone are employable not only in the respective indicated combination, but also in other combinations or else taken alone.

BRIEF DESCRIPTION OF THE DRAWINGS

The invention in the following is explained in more detail on the basis of a preferred embodiment as well as by reference to the enclosed drawings.

These show in.

DESCRIPTION OF THE PREFERRED EMBODIMENTS

Figure 1:
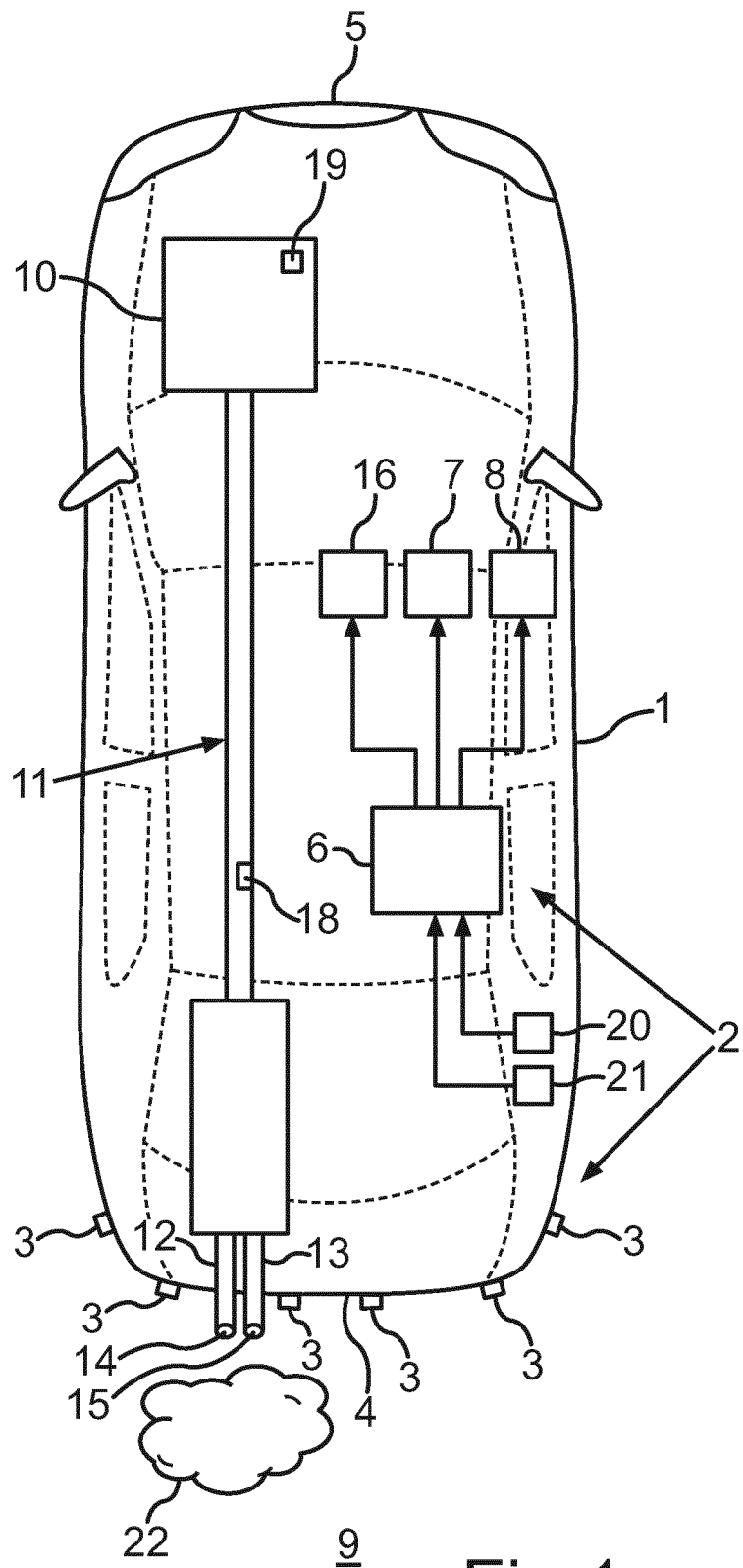
FIG. 1 in schematic representation a motor vehicle with an ultrasonic sensor device according to an embodiment of the invention.

A motor vehicle 1 shown in FIG. 1 is for instance a passenger car. The motor vehicle 1 comprises an ultrasonic sensor device 2, which for instance is part of a driver assistance system, for instance a parking assistance system. The ultrasonic sensor device 2 serves for assisting the driver of the motor vehicle 1 in performing parking operations. For this purpose it comprises a plurality of ultrasonic sensors 3, which are arranged distributed on the rear bumper 4. Corresponding ultrasonic sensors 3 can also be arranged on front bumpers 5 (not shown). The ultrasonic sensors 3 are electrically coupled with a control device 6 of the ultrasonic sensor device 2. The control device 6 represents a control device, which for instance can include a digital signal processor and/or a micro controller and serves for controlling the ultrasonic sensors 3. The control device 6 receives measuring data from the ultrasonic sensors 3 and determines in dependence on these measuring data the distances between the motor vehicle 1 and obstacles in its environment. In dependence on these distances the control unit 6 can control for instance a loudspeaker 7 and/or an optical display unit 8—for instance a display. With the aid of the loudspeaker 7 and/or the display unit 8 the driver is informed about the measured distances. For performing a distance measurement the respective ultrasonic sensors 3 are controlled for emitting the ultrasonic waves into an environmental region 9 of the motor vehicle 1. In this connection both so-called cross measurements (indirect measurements) as well as direct measurements are possible. In the case of indirect measurements a first ultrasonic sensor 3 emits the ultrasonic waves, whilst a different, second ultrasonic sensor 3 is operated as receiving sensor, which receives the echo signals. In the case of direct measurements, however, one and the same ultrasonic sensor 3 is controlled both for emitting as well as for receiving.

Possibly the ultrasonic sensor device 2 can also be an automatic or semi-automatic parking assistance system, by means of which a parking space is automatically detected and a suitable parking trajectory automatically calculated, along which the motor vehicle 1 then can be guided automatically or semi-autonomously into the parking space. In the case of fully automatic parking assistance system the ultrasonic sensor device 2 takes over both the longitudinal guidance as well as the transversal guidance of the motor vehicle 1, during which in semi-automatic systems the ultrasonic sensor device 2 merely automatically takes over the transversal guidance and thus the steering, whilst the driver himself has to accelerate and brake. There are also systems known, in which the driver has to take care of both the longitudinal guidance as well as the transversal guidance, however, information as to the steering are issued by the ultrasonic sensor device 2.

For driving the motor vehicle 1 an internal combustion engine 10 is envisaged, to which an exhaust system 11 of the motor vehicle 1 is connected in a basically known way. The exhaust system 11 in the embodiment has two tail pipes 12, 13 ending in the region of the rear bumper 4, each of which has an outlet 14, 15, via which an exhaust gas produced by the internal combustion engine 10 is released into the environmental region 9. In the motor vehicle 1 moreover a control device 16 is arranged, which serves for controlling a throttle valve of the exhaust system 11 and/or for closing and opening the tail pipes 12, 13 and/or for controlling the internal combustion engine 10.

The motor vehicle 1 is configured as hybrid vehicle and in addition to the internal combustion engine 10 has an electrical driving machine 17, which can be operated, if required.

In the exhaust system 11 at least one sensor 18 is arranged, which serves for capturing at least one of the following measurement parameters: a current temperature of the exhaust gas and/or a current humidity of the exhaust gas and/or a current flow rate of the exhaust gas and/or a current exhaust pressure and/or a current mass flow of the exhaust gas and/or a measurement parameter, which characterizes the current ratio of a combustion air and a fuel in at least one combustion space of the internal combustion machine 10 (in this case the Lambda sensor is used).

The sensor data of the at least one sensor 18 are transmitted to the control unit 6.

Moreover, by means of a temperature sensor 19 an engine temperature of the internal combustion engine 10 can be captured. Also these sensor data, which indicate the respective current engine temperature, are transmitted to the control unit 6.

In the motor vehicle 1 moreover at least one sensor 20 can be arranged, which serves for the capture of atmospheric environmental conditions of the motor vehicle 1, in particular an air humidity and/or air temperature and/or wind speed in the environmental region 9.

Additionally or alternatively, for capturing these data also position signals can be used, which are provided by means of a navigation receiver 21 (for instance GPS) and indicate the current geographic position of the motor vehicle 1. If the current position of the motor vehicle 1 in the control unit 6 is known, a communication link between the control unit 6, on the one hand, and an internet server, on the other hand, can be set up, via which from the control unit 6 to the internet server the current position of the motor vehicle 1 is transmitted. The internet server can then transmit data to the control unit 6, which indicate the current air temperature and/or wind speed and/or air humidity in the environment of the motor vehicle 1.

The control unit 6 in one embodiment is configured in such a way that it can detect independently of sensor data whether in the area of the respective outlet 14, 15 of the tail pipes 12, 13 and thus forms an exhaust gas cloud 22 in the capture area of the ultrasonic sensors 3, on the boundary layer of which the ultrasonic waves emitted by the ultrasonic sensors 3 can be reflected.

Figure 2:
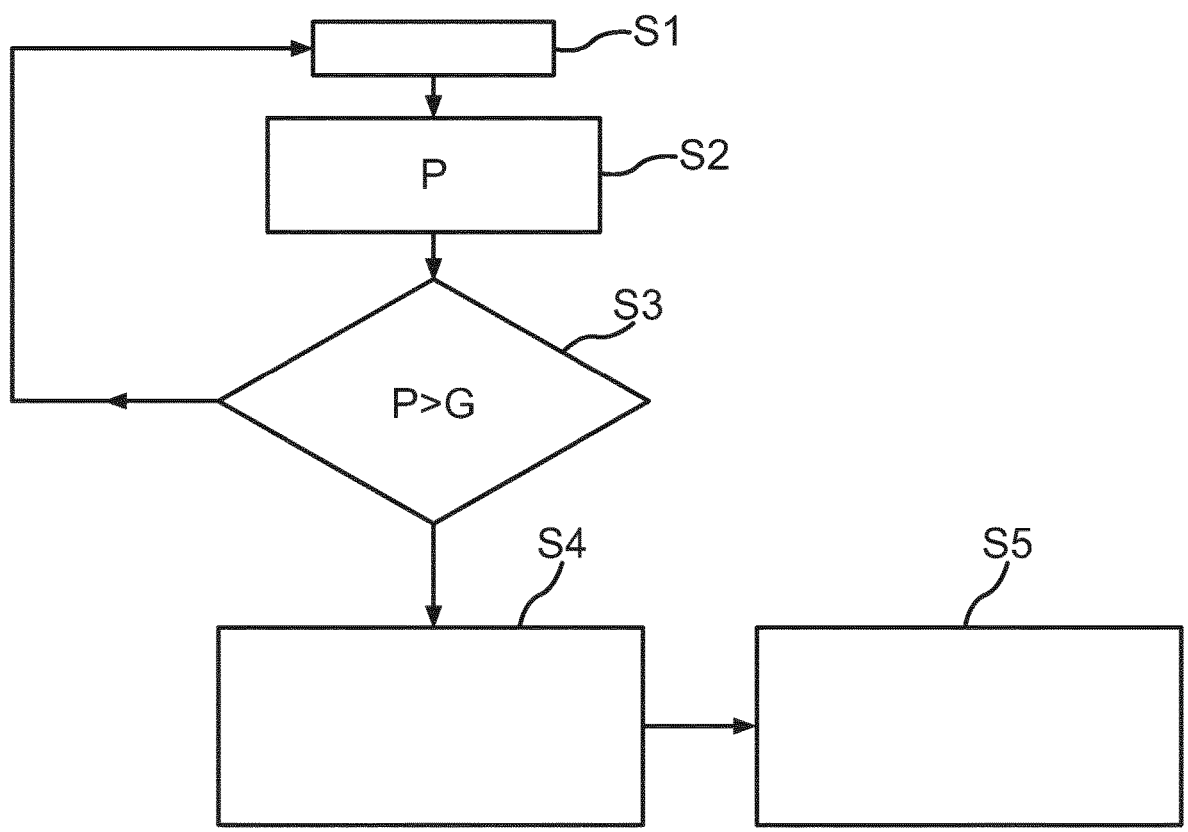
FIG. 2 a flow diagram of a method according to an embodiment of the invention.

A corresponding method for operating the motor vehicle 1 in the following is explained in more detail with reference to FIG. 2:

The method starts in step S1, in which by the control unit 6 sensor data for the detection of an exhaust gas cloud 22 are captured. The following sensor data can be considered:
  the measured temperature of the exhaust gas and/or
  the humidity of the exhaust gas and/or
  the flow rate of the exhaust gas and/or
  the exhaust gas pressure and/or
  the mass flow of the exhaust gas and/or
  the ratio of the combustion air and the fuel and/or
  the current engine temperature and/or
  the current wind speed and/or air humidity and/or air temperature in the environment of the vehicle.

Optionally, in the control unit 6 also the following construction parameters of the motor vehicle can be deposited and be considered in the detection of the exhaust gas cloud 22:
- a distance between the respective ultrasonic sensor 3 and the outlet 3 and the outlet 14, 15 of the respective tail pipe 12, 13 and/or
- a cross-sectional size of the tail pipes 14, 15 and/or
- the number of tail pipes 12, 13 and/or
- the number of exhaust gas turbo chargers of the exhaust system 11 and/or
- the cubic capacity of the internal combustion engine 10 and/or
- the type of the internal combustion engine 10 (Otto engine or diesel).

Optionally, the control unit 6 can also consider the distances measured by the respective ultrasonic sensor 3 and/or the number of received target echoes.

In a step S2 the above-named quantities and parameters are analyzed by the control unit 6 in a random combination, wherein also a weighting of the measuring parameters can be effected. In the detection of the exhaust gas cloud 22 a probability value P is calculated, which indicates the current probability for the presence of such exhaust gas cloud 22. In the calculation of the probability value P the above-named sensor data and optionally also the construction parameter of the motor vehicle 1 are considered. As already mentioned, these can also be correspondingly weighted. According to step S3 it is then checked whether the calculated probability value P is larger than a predetermined threshold value G. If it is detected by the control unit 6 that the probability value P is larger than the threshold value G, the presence of an exhaust gas cloud 22 impairing the ultrasonic waves of the ultrasonic sensors 3 in the capture range of the ultrasonic sensor device 2 is assumed and in particular from then on according to a step S5 the further operation of the motor vehicle 1 by means of the electric drive machine 17 is performed by the internal combustion engine 10 according to step S4 being switched off and the active operation of the electric drive machine 17 being started.

If no exhaust gas cloud 22 is detected or an exhaust gas cloud 22 is detected, which does not impair the ultrasonic waves, the internal combustion engine 10 can be further remain in active operation and the cycle with steps S1 to S3 is repeatedly, at least once, in particular several times performed. In particular this is done as long as either a then interfering exhaust gas cloud is recognized or the active operation of the ultrasonic sensor device 2 is completed.

Alternatively, it may also be envisaged that the motor vehicle 1 is operated independently of a detection of an exhaust gas cloud 22 always then by means of the electric drive machine 17, when the ultrasonic sensor device 2 is activated, for instance then the driver assistance system comprising the ultrasonic sensor device 2, in particular the parking assistance system is activated. This can for instance be the case through an operation element and/or through engaging a reverse gear or a reverse gear selection. In particular, when the internal combustion engine 10 is active, the active operation of the electric drive machine 17 then is switched off with the starting of the driver assistance system and the internal combustion engine 10.

Very generally, it can thus also be envisaged that the electric drive machine 17 is then operated in the active operation, if an automatic or semi-autonomous parking of the motor vehicle 1 is activated, for instance by engaging the reverse gear and/or by means of a corresponding operation element. Whether the internal combustion engine 10 was active before or not, in this embodiment is then irrelevant.

The invention claimed is:

1. A method for operating a motor vehicle comprising a hybrid vehicle equipped with an internal combustion engine and an electric drive machine, the method comprising:
   providing at least one ultrasonic sensor, operated in an active mode, of an ultrasonic sensor device of the motor vehicle;
   emitting ultrasonic waves into an environmental region of the motor vehicle; and
   in the active operation mode of the ultrasonic sensor arranged on a rear part of the motor vehicle, operating the motor vehicle at least temporarily by the electric drive machine;
   on the basis of sensor data of at least one sensor of the motor vehicle being different from the ultrasonic sensor, detecting an exhaust gas cloud, on which the ultrasonic waves are reflected and which is released by an exhaust system of the motor vehicle into the environmental region and generated by the internal combustion engine, in the active operation mode; and
   depending on the detection of the exhaust gas cloud, switching the internal combustion engine off and activating the electric drive machine.

2. The method according to claim 1,
   wherein in the case that upon activating the ultrasonic sensor the motor vehicle is being operated by the internal combustion engine, switching the internal combustion engine off and activating the electric drive machine.

3. The method according to claim 1,
   wherein the exhaust gas cloud is detected on the basis of a characterizing exhaust gas boundary layer.

4. The method according to claim 1,
   wherein the detecting of the exhaust gas cloud is effected in dependence on at least one measurement parameter as sensor data, which is measured by a sensor arranged in the exhaust system.

5. The method according to claim 1,
   wherein the detecting of the exhaust gas cloud is effected in dependence on a current engine temperature as sensor data.

6. The method according to claim 1,
   wherein the detecting of the exhaust gas cloud is effected in dependence on at least one construction parameter of the motor vehicle.

7. The method according to claim 1,
   wherein active operation of the motor vehicle by electric drive machine is started upon activating the ultrasonic sensor.

8. The method according to claim 1,
   wherein the active operation mode of the ultrasonic sensor is started upon starting a driver assistance system with which the ultrasonic sensor is functionally associated.

9. The method according to claim 1,
   wherein the active operation mode of the ultrasonic sensor is started upon engaging a reverse gear selection of the motor vehicle.

10. A motor vehicle comprising:
    a hybrid vehicle having an internal combustion engine and an electric drive machine;
    an ultrasonic sensor device comprising at least one ultrasonic sensor by which, in an active operation mode, ultrasonic waves are capable of being emitted into an environmental region of the motor vehicle;

wherein the motor vehicle, in the active operation mode of the ultrasonic sensor arranged on a rear part of the motor vehicle, at least temporarily is operated by the electric drive machine;

wherein, on the basis of sensor data of at least one sensor of the motor vehicle being different from the ultrasonic sensor, an exhaust gas cloud is detected, on which the ultrasonic waves are reflected and which is released by an exhaust system of the motor vehicle into the environmental region and generated by the internal combustion engine, in the active operation mode; and wherein, depending on the detection of the exhaust gas cloud, the internal combustion engine is switched off and the electric drive machine is activated.

11. The method according to claim 4, wherein the at least one measurement parameter is at least one of the measurement parameters selected from the group consisting of:

a temperature of the exhaust gas;

a humidity of the exhaust gas;

a flow rate of the exhaust gas;

an exhaust pressure;

a mass flow of the exhaust gas; and a measurement parameter characterizing the ratio of a combustion air and a fuel in at least one internal combustion engine of the motor vehicle, which is measured by a Lambda sensor.

12. The method according claim 1, wherein the detecting of the exhaust gas cloud is effected in dependence on atmospheric environmental conditions of the motor vehicle.

13. The method according claim 12, wherein the atmospheric environmental conditions of the motor vehicle are at least one atmospheric environmental condition selected from the group consisting of: a wind speed, an air humidity, and air temperature.

14. The method according to claim 6, wherein the at least one construction parameter of the motor vehicle is at least one construction parameter selected from the group consisting of:

a distance between the ultrasonic sensor and an outlet of a tail pipe of the exhaust system;

a cross-sectional size of the tail pipe;

the number of tail pipes of the exhaust system;

the number of the exhaust gas turbo charger of the motor vehicle;

a cubic capacity of an internal combustion engine of the motor vehicle; and a type of the internal combustion engine.

* * * * *